United States Patent
De Filippis

(10) Patent No.: US 11,451,117 B2
(45) Date of Patent: Sep. 20, 2022

(54) ELECTRIC MACHINE

(71) Applicant: SPAL AUTOMOTIVE S.r.l., Correggio (IT)

(72) Inventor: Pietro De Filippis, Varazze (IT)

(73) Assignee: SPAL AUTOMOTIVE S.R.L., Correggio (IT)

( * ) Notice: Subject to any disclaimer, the term of this patent is extended or adjusted under 35 U.S.C. 154(b) by 315 days.

(21) Appl. No.: 16/594,636

(22) Filed: Oct. 7, 2019

(65) Prior Publication Data
US 2020/0127538 A1    Apr. 23, 2020

(30) Foreign Application Priority Data

Oct. 19, 2018    (IT) .................. 102018000009611

(51) Int. Cl.
*H02K 11/25* (2016.01)
*H02K 11/33* (2016.01)
(Continued)

(52) U.S. Cl.
CPC ............. *H02K 11/25* (2016.01); *H02K 5/18* (2013.01); *H02K 7/12* (2013.01); *H02K 9/22* (2013.01);
(Continued)

(58) Field of Classification Search
CPC .......... H02K 11/25; H02K 11/23; H02K 5/18; H02K 7/12
(Continued)

(56) References Cited

U.S. PATENT DOCUMENTS

2009/0115259 A1*  5/2009  Gamble .................... A62C 5/02
                                                                    307/131
2014/0139059 A1*  5/2014  De Filippis ............. F04D 25/08
                                                                    310/64
(Continued)

FOREIGN PATENT DOCUMENTS

DE    102012025110 A1 *  6/2014    ............. H02K 11/25
DE    102012025110 A1     6/2014
(Continued)

OTHER PUBLICATIONS

European Search Report dated Nov. 29, 2019 from counterpart European Patent Application No. 19203189.6.

*Primary Examiner* — Jose A Gonzalez Quinones
(74) *Attorney, Agent, or Firm* — Shuttleworth & Ingersoll, PLC; Timothy J. Klima

(57) ABSTRACT

An electric machine includes a plurality of conductive tracks defining an electric power circuit, to provide current for electronic power components, a printed circuit board which mounts the conductive tracks, an enclosure which defines a housing for the printed circuit board and has a dissipative wall, a heat-conductive filler interposed between the printed circuit board and the enclosure, an elastic device acting on the printed circuit board to press it against the dissipative wall, a conductive element held in position by at least one heat-sensitive joint and disposed to connect a first track and a second track to close the electric power circuit. The elastic device includes an elastic element pressed against the conductive element to apply a force on the heat-sensitive joint and the heat-sensitive joint is configured to break if subjected to a temperature higher than a predetermined threshold temperature to open the electric power circuit.

21 Claims, 6 Drawing Sheets

(51) Int. Cl.
*H02K 5/18* (2006.01)
*H02K 7/12* (2006.01)
*H02K 9/22* (2006.01)

(52) U.S. Cl.
CPC .......... *H02K 11/33* (2016.01); *H02K 2211/03* (2013.01)

(58) Field of Classification Search
USPC ................................................ 310/64, 68 C
See application file for complete search history.

(56) References Cited

U.S. PATENT DOCUMENTS

| | | | | |
|---|---|---|---|---|
| 2015/0318131 A1* | 11/2015 | Matthiesen | ............ | H01H 11/00 337/407 |
| 2019/0148099 A1* | 5/2019 | Markert | ................ | H05K 3/222 337/170 |

FOREIGN PATENT DOCUMENTS

| | | | |
|---|---|---|---|
| DE | 102016213019 | B3 | 12/2017 |
| WO | 2013008180 | A2 | 1/2013 |
| WO | 2014091026 | A2 | 6/2014 |
| WO | 2014125412 | A1 | 8/2014 |

\* cited by examiner

ELECTRIC MACHINE

This application claims priority to Italian Patent Application 102018000009611 filed Oct. 19, 2018, the entirety of which is incorporated by reference herein.

This invention relates to an electric machine, with reference in particular to a system for protecting it against high internal temperatures, and to a method for making the electric machine.

In general, an electric machine, for example a brushless electric motor to which reference is made hereinafter without limiting the scope of the invention, comprises a casing having inside a stator, rigidly connected to the casing, and a rotor, for example with permanent magnets, rotatably connected to the casing.

An example of a prior art electric machine used as a reference for the present patent is described in application WO2013008180 in the name of the present Applicant.

An electronic module, connected to the stator in brushless electric motors, comprises a printed circuit board and, disposed on the printed circuit board itself, a plurality of active and passive electronic components defining a power section and a plurality of electronic signal components defining a control section.

Some of these electronic components are surface mounted devices (SMD)—for example the power MOSFETs—and have the advantage of being able to be attached to the printed circuit board in bulk using an oven brazing process.

The casing is closed by a cap to form a sealed container from which connecting pins protrude to allow powering and controlling the electronic drive circuitry. In sealed electric machines, the cap is closed hermetically in such a way as to insulate the electrical and movable components from humidity, dust and atmospheric agents.

Electric machines of this kind are used in particular in the automotive sector and in other sectors subject to stringent safety regulations which are constantly changing. In particular, overheating of these electric machines constitutes a real risk, especially if the machines are installed near internal combustion engines or other sources of heat.

The possible effects of overheating may include malfunctioning of the electric machine itself, interference or damage to the power supply system it is associated with and possible undesirable consequences for other devices connected to it and, in the worst cases, fire and explosion.

To prevent overheating and reduce its undesirable effects, several solutions have been designed and implemented. Most of these are based on the development and improvement of the convective dissipation of the heat generated inside the machine. Patent document WO2014125412, in the name of the present Applicant, describes a solution aimed at dissipating the heat generated by the electronic components of the electric machine.

Disadvantageously, these solutions are ineffective in the case of unexpected rises in the temperature of the atmosphere in which the machine is working and with which the machine is designed to exchange heat in order to dispose of it. Such temperature rises might be due, for example, to a failure of a cooling system outside the machine.

The above mentioned solutions might also be ineffective in the case of malfunctions and exceptional events regarding the electric machine and which might cause unexpected rises in temperature.

The demand from the market and from supervisory and certification bodies for increasingly safe electric machines has given rise to the need for an intrinsic safety mechanism to cut off the machine power supply in the event of overheating before the temperature can reach dangerous levels.

One possible solution known from the prior art consists in fitting a customary thermal fuse along a power supply circuit of the electronic power components inside the electric machine, so as to cut off the power supply to stop the machine in the event of overheating. This solution has several disadvantages, however.

Known thermal fuses comprise a fusible pellet used to hold down a preloaded conductive spring. When the temperature rises, the pellet melts and releases the spring, thereby breaking the circuit. Disadvantageously, the structure of known thermal fuses is such that they cannot be oven brazed together with other electrical components because the heat in the oven would trigger the thermal fuse. They must therefore be installed after the printed circuit boards have gone through the oven and they must be attached using a dedicated localized process which increases electric machine assembly time and costs.

Another disadvantage of known thermal fuses is that, on account of the fluxes they contain, they have a tendency to gradually deteriorate when subjected to constantly high temperatures, even if lower than their nominal trigger temperature. This makes them unsuitable for use in high-temperature environments such as those typical of automotive applications, often the engine compartment of the vehicles.

Other disadvantages of known thermal fuses are due to their relatively high unit cost, the technical limitations they are subjected to, which limit their operating currents and temperatures and which are often in conflict with specific market requirements for the electric machine of the kind in question, and the impossibility of integrating them with other machine components and systems to make them more efficient in terms of cost, weight and overall functioning.

In this context, the technical purpose which forms the basis of this invention is to propose an electric machine and a method to make it to overcome the above-mentioned disadvantages of the prior art.

The aim of this invention is to provide an electric machine equipped with a high temperature protection system and a method for making such a machine which are more efficient in terms of production costs and components.

A further aim of this invention is to provide an electric machine equipped with a high temperature protection system and a method for making such a machine, where the high temperature protection system is resistant to prolonged use at high temperatures close to the threshold temperature at which the protection is triggered.

A yet further aim of this invention is to provide an electric machine whose possible supported operating current and temperature ranges are wider than those allowed by prior art devices.

Other features and advantages of the disclosure are more apparent in the non-limiting description, with reference to a preferred but non-exclusive embodiment of an electric machine as illustrated in the accompanying drawings, in which.

Figure 1:
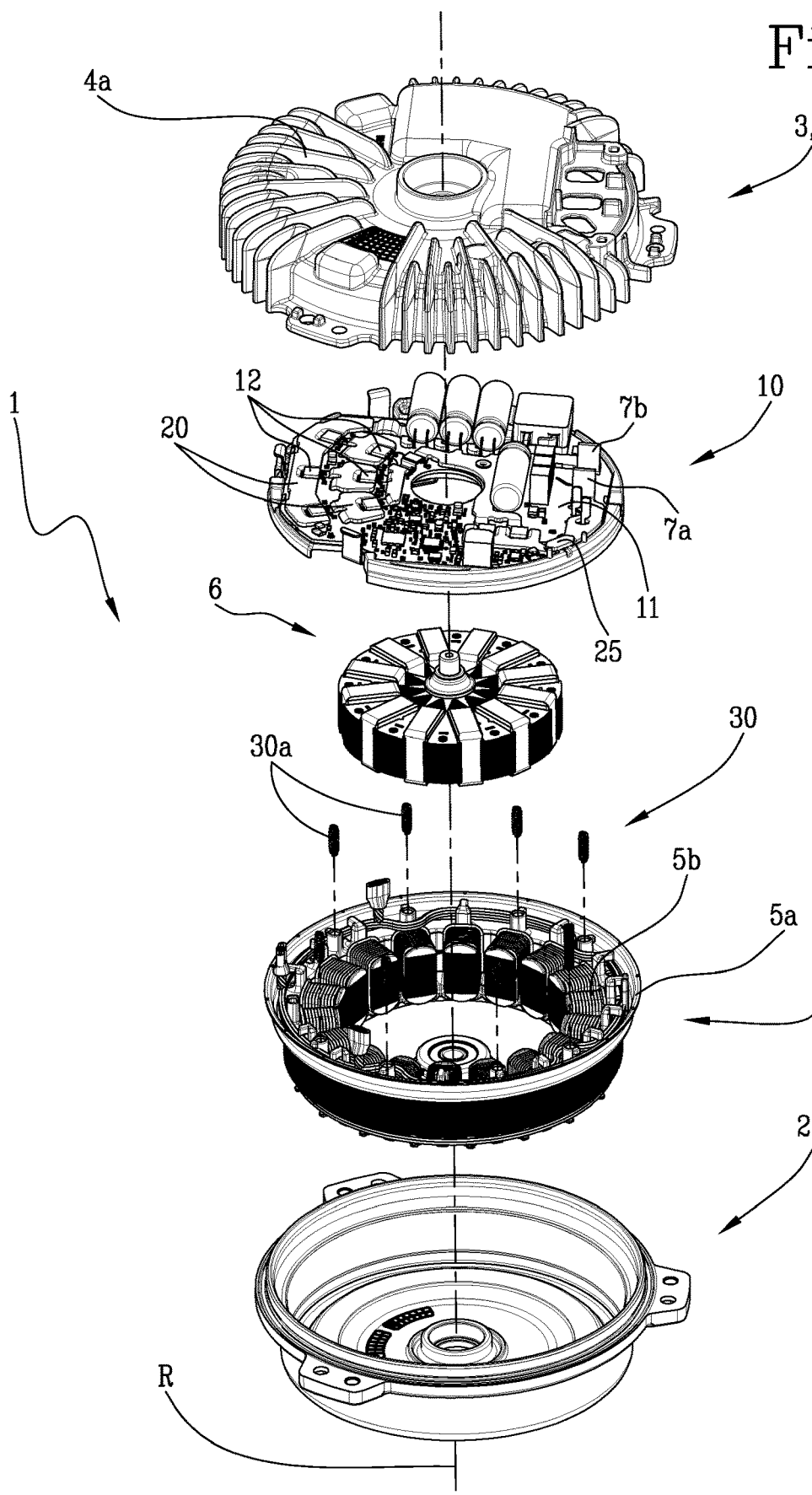
FIG. 1 is an exploded perspective view of an electric machine according to this invention, with some components removed for simplicity.

The numeral 1 generically denotes an electric machine according to this invention which is hereinafter described in detail only insofar as necessary for understanding this disclosure.

The electric machine 1 is preferably a rotary electric machine and, in the preferred embodiment of it, it is an electric motor of the sealed type, that is to say without any opening giving access to the inside of it except possibly for pressure relief valves, which are, in any case, sealed. Express reference is made to this embodiment without thereby losing in generality.

In the embodiment illustrated, the electric machine 1 comprises a casing 2 and a cap 3 which closes the casing 2 to define, together with the casing 2, an enclosure 4, or container, which is closed and preferably sealed.

The cap 3 has a dissipative wall 4a configured to facilitate dissipation of the heat from the components inside the enclosure 4 and is preferably provided with a plurality of dissipating fins disposed at the dissipative wall 4a and directed towards the outside of the enclosure 4.

Preferably, the electric machine 1 comprises a stator 5, fixedly mounted in the casing 2, and a rotor 6 associated therewith and connected to the enclosure 4 rotatably about an axis of rotation "R".

Schematically, the stator 5 comprises: a ferromagnetic core 5a; a plurality of conductive windings 5b wound around it; and isolators interposed between the ferromagnetic core and the windings.

At least the ferromagnetic core 5a and the isolators define a stator mount for the conductive windings 5b.

Generally speaking, the term "stator mount", as used in this disclosure, means the set of components of the electric machine 1 which keep the windings 5b in shape and position, prevent accidental movement thereof and facilitate heat dissipation.

The isolators in the stator 5, commonly known as "front pieces", are insulants and preferably made of polymeric material.

A first front piece 40 of the stator front pieces is provided with a plurality of holes 40a extending parallel to the axis of rotation "R".

The holes 40a allow the stator 5 to be keyed into the casing 2 using a machine which uses a plurality of bits to press directly on the ferromagnetic core through the holes 40a, thus preventing damage to the front piece 40.

The electric machine 1 also comprises power pins 7a and 7b which, in the embodiment illustrated, pass through the enclosure 4 and are configured for electrical connection to a direct current power source outside the electric machine 1.

The electric machine 1 comprises an electronic module 10 which in turn comprises a printed circuit board 11, or PCB, and a plurality of electronic power components 12.

In the preferred embodiment, the electronic power components 12 comprise a plurality of power transistors—for example, MOSFETs 12a—electrically connected to the windings 5b to modulate their voltages and electric currents in order to drive and control the rotation of the rotor 6.

Preferably, the electronic module 10, and in particular, the printed circuit board 11 is mounted on a supporting element 13 disposed on an underside of the printed circuit board 11.

The supporting element 13 is interposed between the electronic module and the stator and rotor 5 and 6. The supporting element 13 is preferably made of self-extinguishing, electrically insulating plastics and is provided with a housing for the electronic module 10.

The supporting element 13 has a lateral surface which is shaped to match the casing 2 or the cap 3 so as to reduce, in practice, the possibility of movement of the electronic module 10 inside the enclosure 4.

The electronic module 10 comprises a plurality of conductive tracks 20 disposed on the printed circuit board 11, preferably in relief thereon, between the power pins 7a and 7b and the electronic power components 12 in such a way as to form an electric power circuit 10a to power the electronic power components 12. In the embodiment illustrated, the conductive tracks 20 are in relief by 1.8 mm on the printed circuit board 11.

The conductive tracks 20 are disposed at a position facing the dissipative wall 4a and are preferably made of a copper alloy that is a good conductor of both electricity and heat. Further, the conductive tracks 20 are sized in such a way as to define heat pipes between the electronic power components 12 and the dissipative wall 4a. In particular, this thermal sizing of the conductive tracks 20 involves oversizing them for the purposes of electrical conductivity, which does not have unwanted effects and minimizes electrical resistance.

Figure 2:
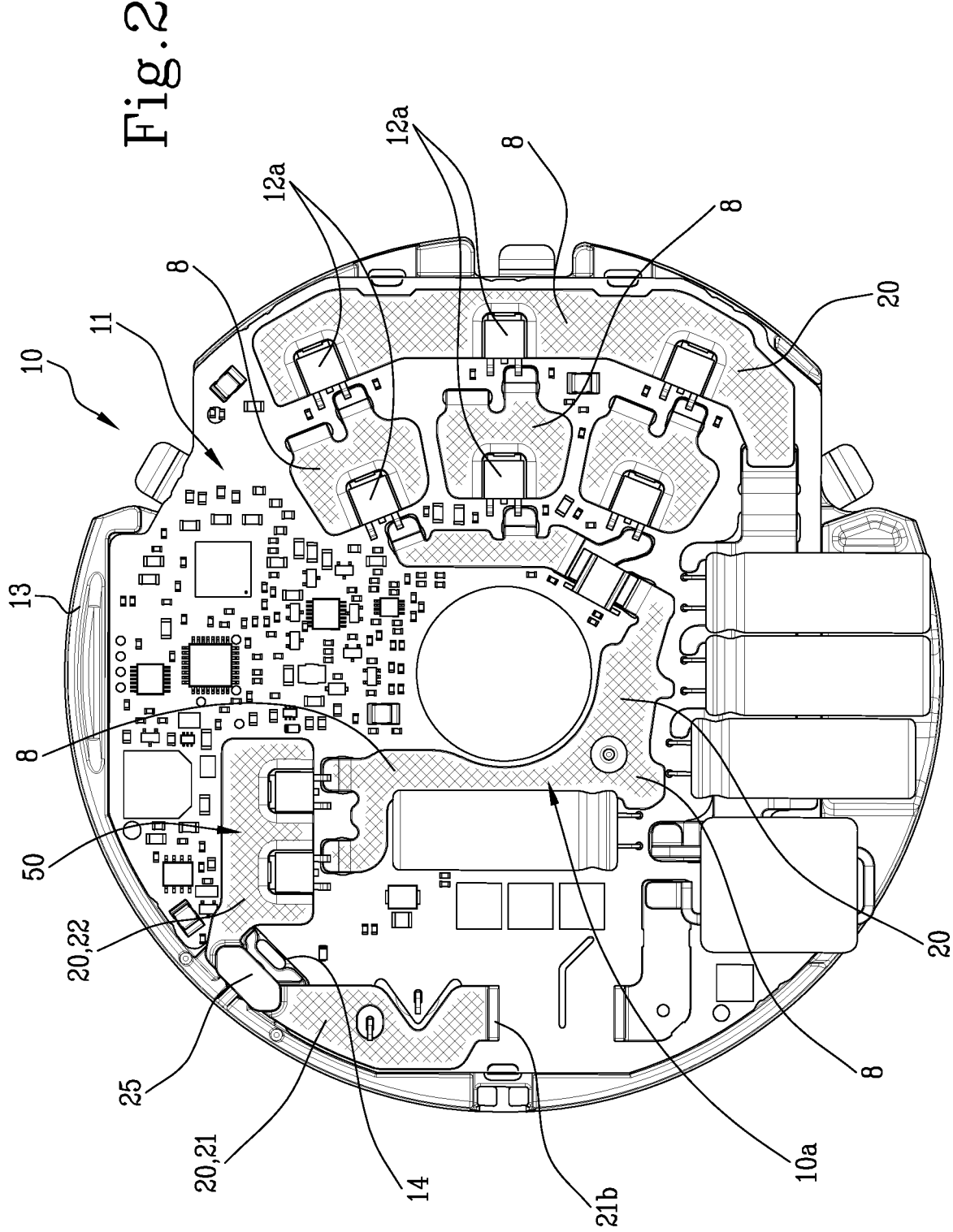
FIG. 2 is a top view of an electronic module of the electric machine of FIG. 1, with some components removed for simplicity.
Figure 3:
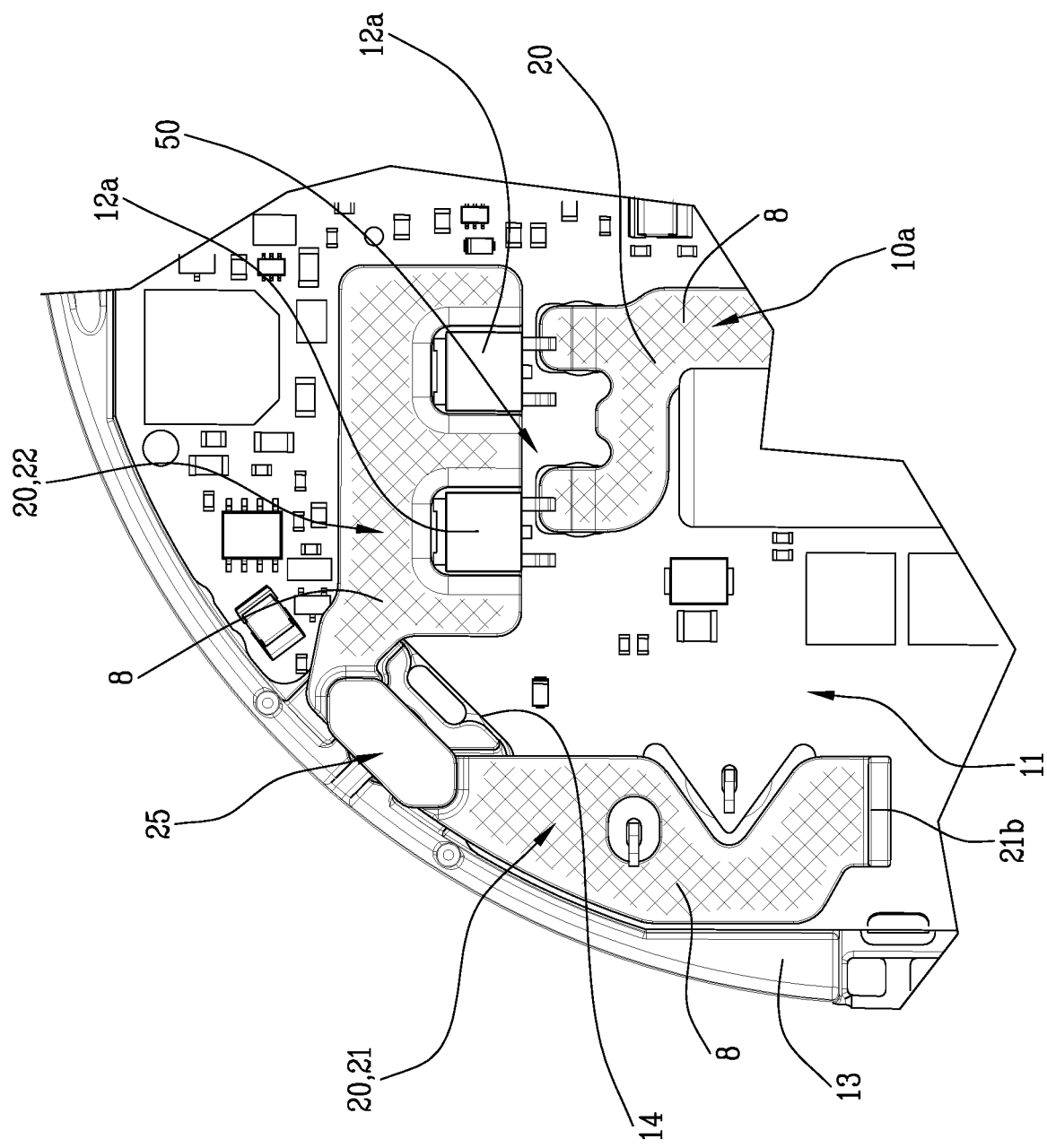
FIG. 3 is a top view of a detail of the electronic module of FIG. 2.
Figure 4:
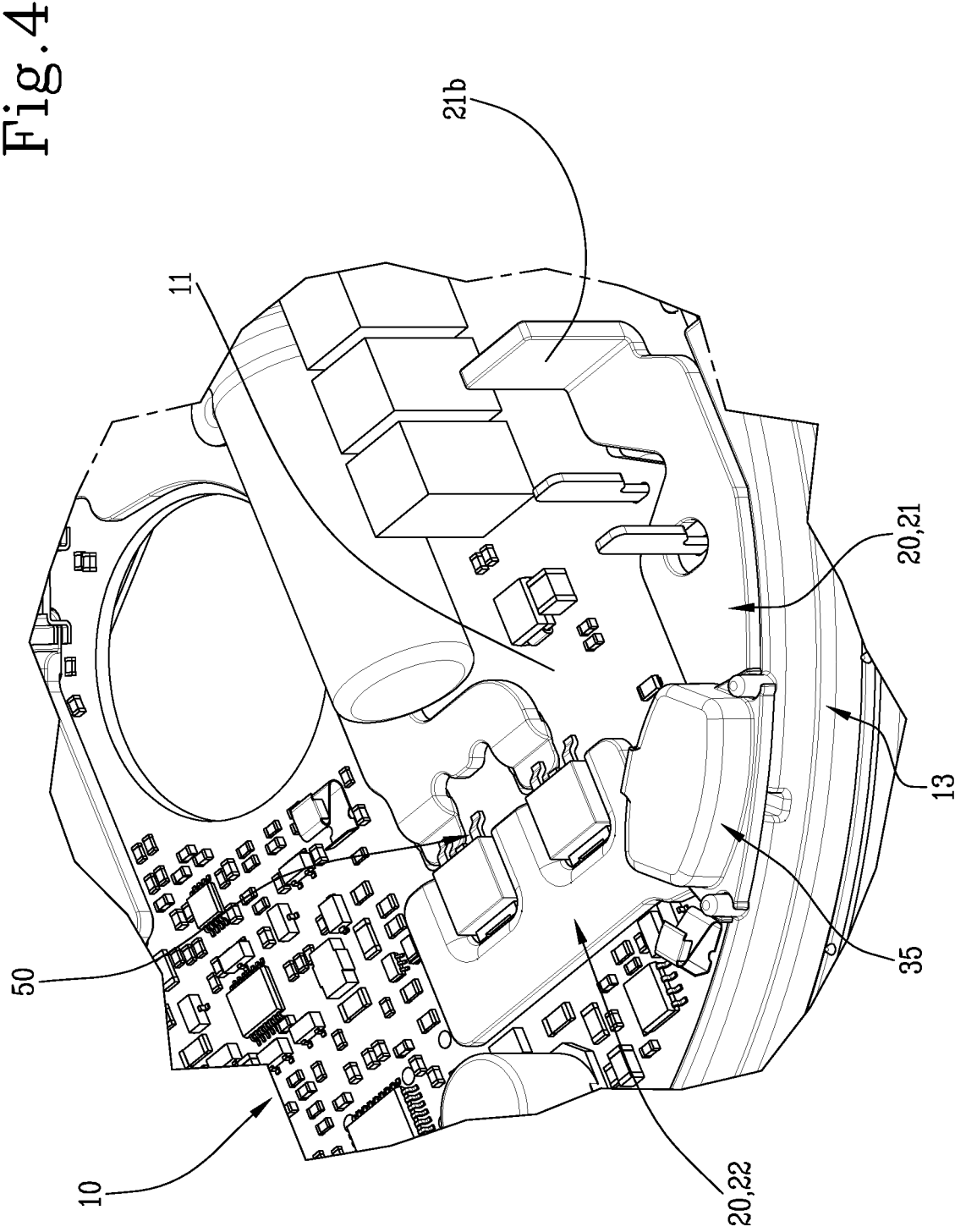
FIG. 4 is a perspective view of a detail of the electronic module of FIG. 2.
Figure 6:
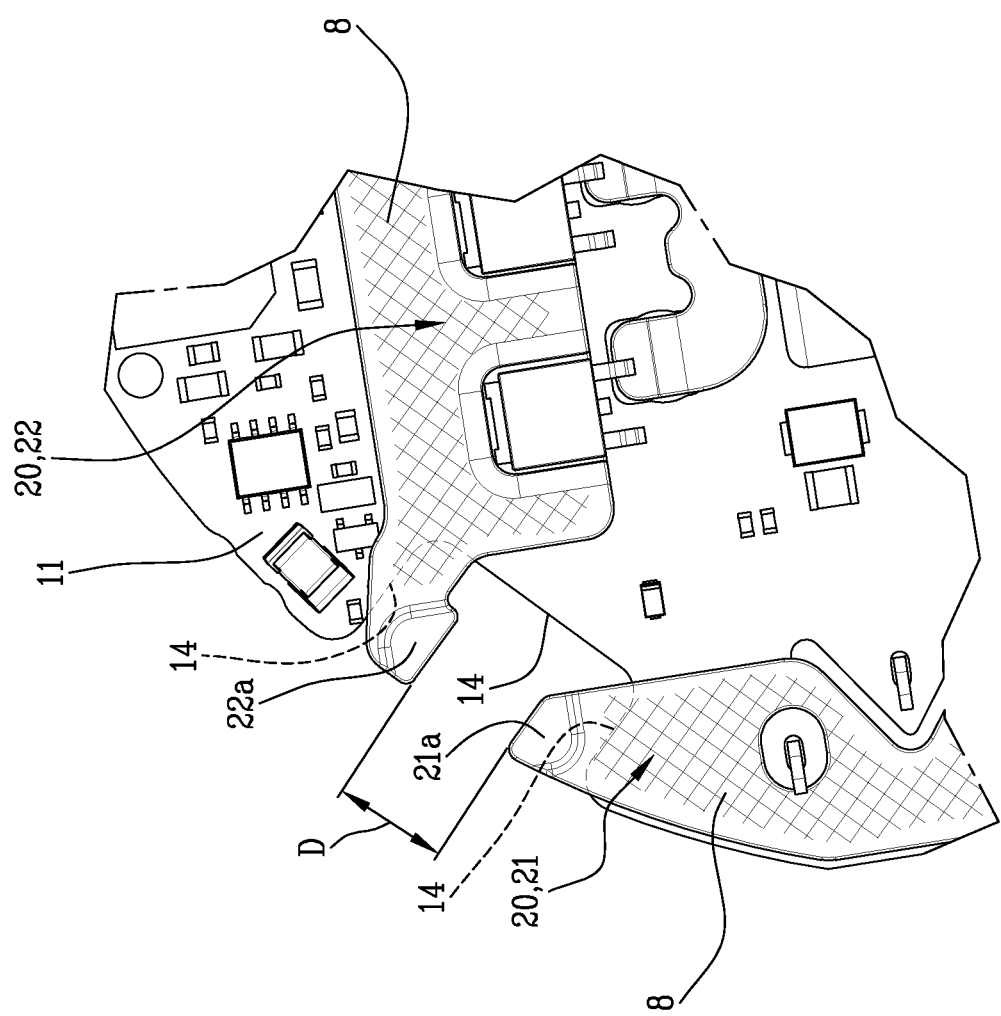
FIG. 6 is a top view of a detail of the electronic module of FIG. 2, with some parts removed to better illustrate others and with some items shown as hidden parts.

A heat-conductive filler 8, comprising, for example, a heat-conductive paste, is interposed between the conductive tracks 20 and the dissipative wall 4a to fill in gaps between the two parts and facilitate heat conduction between them, as illustrated in FIGS. 2, 3 and 6, where the heat-conductive filler 8b is represented by cross-hatching.

The heat-conductive filler 8 is also interposed between at least some of the electronic power components 12 and the dissipative wall 4a to facilitate direct dissipation of the heat generated by them.

The conductive tracks 20 have respective surfaces for contact with the MOSFETs 12a and with the dissipative wall 4a (through the heat-conductive filler 8), and which are sized in such a way as to create, in conjunction with the size of the conductive tracks 20 themselves, a preferential path for dissipating the heat generated by the MOSFETs 12a.

This path is preferably configured to keep the temperature of the MOSFETs 12a below 160° C., preferably at 150° C. when the electric machine 1 operates in an atmosphere at 120° C., as for example the engine compartment of a vehicle.

The electric machine 1 comprises a plurality of elastic means 30 acting on the electronic module 10 in such a way as to press it against the cap 3.

In the example illustrated, the elastic means 30 comprise metal springs 30a, which might be replaced, for example, by elastomers and the like.

The heat-conductive filler 8, which is at least partly compressed, facilitates heat conduction at least between the conductive tracks 20 and the dissipative wall 4a and between the electronic components and the dissipative wall 4a, allowing the heat produced by the electric machine 1 to be dissipated regularly over time.

In the preferred embodiment, at least some of the springs 30a are inserted in the holes 40a in the front piece 40 and have one end abutted against the ferromagnetic core and the other end abutted against the supporting element 13 to press the entire module 10 away from the stator 5 and towards the dissipative wall 4a. That way, amongst other things, the conductive tracks 20 and the heat-conductive filler 8 above it are forced against the dissipative wall 4a.

The plurality of conductive tracks 20 preferably comprises a first conductive track 21 and a second conductive track 22 forming an integral part of the electric power circuit 10a so that the power supply current of the electronic power components 12 passes through them.

In the embodiment illustrated by way of example, the first track 21 and the second track 22 are disposed on the top of the printed circuit board 11, preferably in relief thereon, in proximity to the power pins 7a and 7b. More specifically, the first track 21 comprises one of the power pins 7a and 7b, whilst the second track 22 is connected to the rest of the electronic module 10.

The electronic module 10 comprises a conductive element 25—for example, a metal plate or bridge—which is electrically connected to the first and the second track 21 and 22 to close the electric power circuit 10a.

In the example illustrated, the conductive element 25 allows the currents between the power pins 7a and 7b to power the plurality of electronic power components 12 and to drive the rotor 6 in rotation.

The conductive element 25 preferably has a thickness which is greater than or equal to 1.8 mm; that is to say of the same order of size as the tracks so as not to create a resistive element of significant impact on the electric power circuit 10a.

The conductive element 25 is fixed to the first and second tracks 21 and 22 by respective heat-sensitive joints 26 which, in the embodiment illustrated, are welds comprising a brazing alloy, preferably an alloy of tin and silver.

In the preferred embodiment, the conductive element 25 is disposed to partly overlap the first and the second track 21 and 22 to form a bridge therebetween.

Advantageously, the elastic means 30 comprise an elastic element 31, preferably a metal spring, to which reference is expressly made without thereby losing in generality, acting on the conductive element 25 in such a way as to apply a thrust force thereon directed away from the first and second conductive tracks 21 and 22.

This thrust force is transmitted to the electronic module 10 through the heat-sensitive joints 26 in such a way as to contribute to pushing it towards the dissipative wall 4a.

Preferably, a first end of the elastic element 31 is disposed in abutment against the ferromagnetic core 5a of the stator 5.

The elastic element 31 passes through one of the holes 40a on the front piece which has a specific cup-like housing to come directly into abutment against the ferromagnetic core 5a.

The second end of the spring 31, on the other hand, is operatively disposed in abutment against the conductive element 25.

In practice, in the embodiment illustrated by way of example, the spring 31 has a line of action which is parallel to the axis of rotation of the machine 1.

A cover or spacer 32 made of electrically insulating material is disposed between the end of the spring 31 and the conductive element 25 to prevent short circuits between the latter and the ferromagnetic core 5a.

Advantageously, the thrust force applied by the elastic element 31 on the conductive element 25 creates strain in the heat-sensitive joints 26 and the latter are configured to resist it mechanically when their temperature is below a predetermined threshold temperature, specifically a temperature at which the brazing alloy melts, preferably between 180° C. and 250° C., and still more preferably, between 200° C. and 230° C.

If the temperature of the heat-sensitive joints 26 is greater than the predetermined threshold temperature, the joints mechanically yield to the strain and break, for example because the brazing alloy melts, causing the conductive element 25 to move away from the first and/or the second conductive track 21 and 22 so as to break the electrical connection between them.

This event opens the power supply circuit of the electric power circuit 10a and instantaneously cuts the power supply to the electronic power components 12, causing the electric machine 1 to stop. Advantageously, these features constitute a high temperature protection for the electric machine 1.

Preferably, the conductive element 25 is configured to allow electric currents greater than 80 amps, preferably greater than 100 amps, to pass between the first track 21 and the second track 22. More specifically, the interface surfaces between the conductive element 25 and the first and second tracks 21 and 22 are sized to allow such currents to pass without causing the heat-sensitive joints 26 to break or electrical resistance to be generated at the ends of the conductive element 25 in an order of magnitude comparable with that of the dissipative components of the electric machine 1.

In an alternative embodiment, not illustrated, the conductive element 25 is fixed to only one between the first and the second track 21 and 22 by a heat-sensitive joint 26 and is permanently connected electrically to the other so that if the temperature rises above the threshold temperature, only the heat-sensitive joint 26 breaks under the pressure of the elastic element 31, causing the electric power circuit 10a to open.

The printed circuit board 11 and the supporting element 13 are shaped to allow positioning the spring 31 between the ferromagnetic core 5a and the conductive element 25.

Preferably, the printed circuit board 11 has a recess, i.e. an absence of material, at the spring 31.

In the embodiment illustrated, the absence of material or recess in the printed circuit board 11 is defined by a portion formed on its outer perimeter delimited by a concave end edge 14.

Preferably, the supporting element 13 has a through hole 13a under and substantially at the concave portion.

Preferably, the first and second tracks 21 and 22 have a first and a second end portion 21a and 22a, respectively, facing each other and protruding from the end edge 14 towards each other to form cantilevered conductive portions extending over the recess of the printed circuit board 11.

Preferably, the conductive element 25 is welded to respective areas of the first and second end portion 21a and 22a where the first and second tracks are thinner than they are in the rest of their structure. These thin areas are preferably shaped to match an outer profile of the conductive element 25 to define a housing for containing or positioning the conductive element.

In other words, the end portions 21a, 22a of the tracks 21, 22 are shaped in such a way as to define the housing to contain the conductive element 25.

More specifically, the conductive element 25 is welded to the first and the second end portion 21a and 22a in such a way as to be suspended above the recess in the printed circuit board 11, thanks also to the configuration of the containment housing.

Preferably, the printed circuit board 11 and the conductive element 25 are configured and mutually positioned in such a way that the vertical projection of the conductive element onto the positioning plane of the printed circuit board 11 is entirely inside the recess and at least 1 mm—preferably 2 mm—away from the end edge 14.

Advantageously, this feature prevents melting other accidental damage to the printed circuit board 11 from causing a short circuit with the conductive element 25 by closing the electric power circuit 10a after it is opened when the heat-sensitive joint 26 breaks.

Preferably, the first and second end portions 21a and 22a are spaced apart by a mutual distance D of between 5 mm and 10 mm, preferably between 6.5 mm and 8.5 mm and still more preferably, between 7 mm and 8 mm. In the embodiment illustrated, the distance D is 7.5 mm and determines the maximum voltage across the first and the second track 21 and 22 within which the components described can guarantee that the electric power circuit 10a remains open after the conductive element 25 has been triggered, preventing an electric arc from being generated across the first and the second track 21 and 22.

Figure 5:
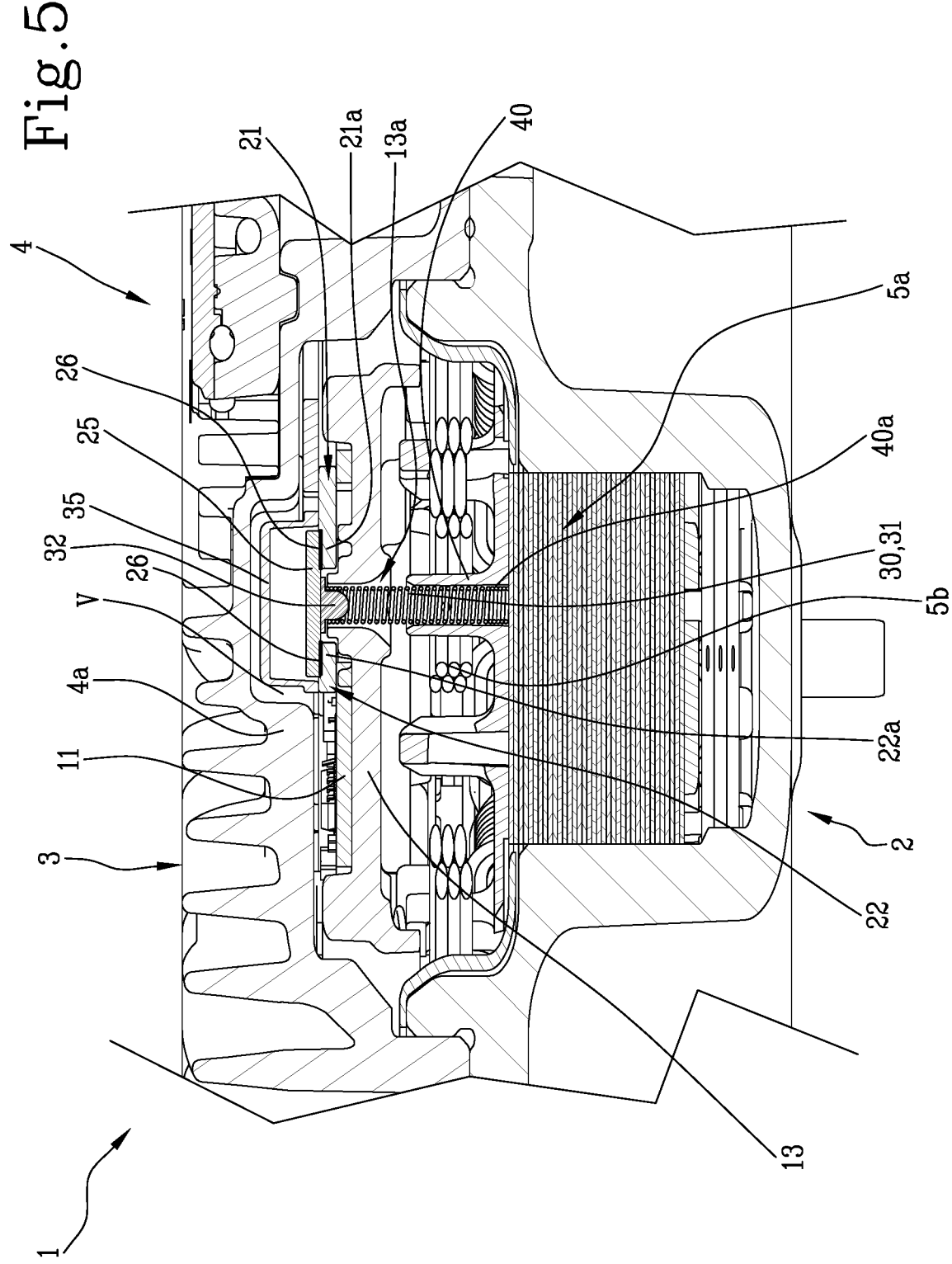
FIG. 5 shows a cross section of the electric machine of FIG. 1.

With reference in particular to FIG. 5, the part of the enclosure 4 above the conductive element 25 defines a housing space "V" adapted to enable the conductive element 25 to move away from the first and second tracks 21 and 22.

The electric machine 1 also comprises a stop element 35, which is located near the conductive element 25, along a direction of thrust of the elastic element 31, in order to determine a stop position of the conductive element 25 driven by the elastic element 31 when the heat-sensitive joint 26 breaks.

The stop element 35 is preferably at least partly coupled to the supporting element 13.

More specifically, the stop element 35 is disposed in the housing space "V", preferably fastened to the printed circuit board 11 and/or to the supporting element 13 by a reversible clip, in such a way that the conductive element 25 is stopped at a position where the elastic element 31 is still loaded and presses the conductive element 25 against the stop element 35 to prevent further movements which might create a short circuit between one of the conductive tracks 20 and the enclosure 4, connected to earth, or between other components of the electronic module 10 and the electric power circuit 10a.

This stop position determines a distance of at least 2 mm—preferably at least 3 mm—between the conductive element 25 and each of both the first and the second track 21 and 22.

Preferably, the elastic element 31 is configured to apply a residual pressure on the conductive element 25 at the stop position so as to lock it at that position in the presence of accelerations on the conductive element up to 20 g—preferably up to 50 g—which can occur on the electric machine 1 in situations created by high impact or resonance in the vehicle engine compartment where it is essential that the electric power circuit 10a remains open.

In the preferred embodiment, the stop element 35 has a concave shape and is disposed in such a way as to fully enclose the conductive element 25 at the stop position. Further, the stop element 35 and the supporting element 13 are configured to define a protective cage around the conductive element 25 to prevent access by particles or extraneous objects large enough to close the electric power circuit 10a when the conductive element 25 is at the stop position.

More specifically, the stop element 35 defines an upper portion of the cage and a portion of the supporting element 13 around the through hole 13a for the passage of the elastic element 31 is configured to close the upper portion at the bottom.

Preferably, both the stop element 35 and the supporting element 13 are made of self-extinguishing, electrically insulating materials with a melting point at least 80° C. higher than the predetermined threshold temperature, so as to keep the electric power circuit 10a in the open condition in the presence of exceptionally high temperatures inside the enclosure 4 and other faults or exceptional events.

In a preferred embodiment, the electronic module 10 comprises a protection circuit 50 disposed along the electric power circuit 10a comprising at least one MOSFET 12a (preferably two), and having a twofold function.

One function of the protection circuit 50 is to provide an active protection against inversion of polarity at the terminals of the electric power circuit 10a; should such an event occur, the protection circuit 50 opens the power circuit 10a to prevent damage to the electronic module 10.

To minimize the possibility of a short circuit remaining in the electronic module 10 after the electric power circuit 10a has been opened by the conductive element 25, the latter is disposed in proximity to the power pin 7a.

In the embodiment described by way of example, the two components (conductive element/power pin are approximately 30 mm apart.

The power pin 7a is preferably one end 21b of the first track 21. To allow the aforementioned weld to be made, the mass of the first track 21 must be able to provide a heat capacity greater than 2.5 J/K, preferably greater than 3 J/K, which means approximately 7.5 grams of copper based alloy. Advantageously, this heat capacity allows the first track 21 to absorb the heat transient connected with the making of the aforementioned weld before the material the heat-sensitive joint 26 is made of melts.

In a further embodiment, not illustrated, components similar to those described are positioned along the electric power circuit 10a and replicated both in proximity to the power pin 7a and in proximity to the power pin 7b. Advantageously, this system allows the electric machine 1 to be protected not only against problems involving a short circuit between the negative pin and other components of the electric machine 1 (for example, the cap 3), where opening the electric power circuit 10a at the positive pin would be useless, but also against problems in a short circuiting between the positive pin and other components.

This invention also has for an object a method for making an electric machine 1 of the type described above, comprising a step of preparing an electronic module 10 of the type described above.

The description of the method is limited to the steps necessary for the understanding of this invention. The method comprises a step of fastening a conductive element 25 to the electric power circuit 10a by means of at least one heat-sensitive joint 26, preferably one for fastening the conductive element 25 to the first track 21 and one for fastening the conductive element 25 to the second track 22, in such a way as to close the electric power circuit 10a.

Preferably, the step of fastening comprises oven brazing, performed when the printed circuit board 11 is passed through an oven, where a plurality of electronic power components 12, including the aforementioned MOSFETs 12a, are attached to the conductive tracks 20 by braze welding. More specifically, the heat-sensitive joints 26 are made by interposing the above described brazing alloy between the conductive element 25 and the first and/or the second track 21 and 22 and melting the same during oven braze welding. Preferably, the first and second tracks 21 and 22 are pre tinned to facilitate braze welding and before being braze welded in the oven, a cut is made in the tin layer to prevent capillary spreading of the brazing alloy on the surface.

The electronic module 10 is then preferably placed in the supporting element 13.

In an embodiment of it, this method comprises a step of fastening the stop element 35 at the conductive element 25 along its direction of thrust as described above with reference to the electric machine 1.

The stop element 35 is preferably at least partly coupled to the supporting element 13.

Once the stator 5 and the rotor 6 have been placed in the casing 2, the springs 30a, 31 are inserted into the respective holes 40a in the front piece 40 and the supporting element 13/electronic module 10 assembly is also placed in the casing, above the stator 5.

Next, after placing the heat-conductive filler 8 at least on the conductive tracks 20 and on the electronic power components 12, the method comprises a step of closing the casing 2 with the cap 3.

The step of closing comprises a step of compressing the elastic means 30 to press the electronic module 10 against the dissipative wall 4a of the cap 3 and compressing also the heat-conductive filler 8.

During this step of compressing, the elastic element 31 is compressed between the ferromagnetic core 5a and the conductive element 25 to create a force on the heat-sensitive joints 26 and to obtain the embodiment described above.

Preferably, the step of compressing the elastic means 30 is accomplished by moving the casing 2 and the cap 3 towards each other in such a way that the elastic element 31 comes into abutment with, and is compressed between, the stator 5, specifically the ferromagnetic core 5a thereof, and the conductive element 25.

After the casing 2 and the cap 3 have been moved towards each other, they are connected to each other to define and close the internally sealed enclosure 4.

The method of the invention also comprises a step of electrically connecting a power cable, not illustrated, to the power pins 7a and 7b and then sealing the connection zone.

This step is carried out in such a way as to heat the end 21b for a welding time which is less than the time necessary for the heat-sensitive joints 26 to reach a predetermined threshold temperature.

In some embodiments, configured to provide the electric machine 1 with protection both against malfunctioning involving a short-circuit between the power pin 7a and other components of the electric machine 1 and against malfunctioning involving a short-circuit between the power pin 7b and other components, some of the steps of the method for making the electric machine 1 are specifically adapted to replicate the components which cause the electric power circuit 10a to open in proximity to the power pin 7b.

More specifically, when the printed circuit board 11 is run through the oven, two conductive elements 25, similar to the ones described above, are welded to conductive tracks facing and separated from each other, similar to the first and the second track 21 and 22 described above and replicated both at the power pin 7a and at the power pin 7b. The subsequent steps are carried out to compress two elastic elements 31 between the conductive elements 25 and the stator mount 5a, similarly to what is described above.

This invention achieves the proposed aim of overcoming the disadvantages of the prior art. In effect, connecting the conductive element to the conductive tracks using a layer of heat-sensitive material subjected to the force of the elastic element constitutes an effective system of protection against high temperature and high current, capable of cutting the electrical power supply to the electrical components of the electric machine.

Advantageously, in the above described method for making the electric machine, the conductive element is attached to the conductive tracks before being subjected to the force of the elastic element, which is added at a later stage. This allows attaching the elastic element to the conductive tracks in the same run through the oven in which the other SMD components are braze welded, allowing the high temperature protection system to be implemented without the need for additional, time consuming operations specifically for attaching the elastic element. Another advantage of the above method is that the only step that distinguishes the electric machine described from an electric machine not provided with high temperature protection is that of placing the elastic element. That means both machines can be made on the same production line, simply omitting the step of placing the elastic element if the electric machine being made is without high temperature protection.

A further advantage of the machine and production method described lies in the resistance to prolonged use at temperatures which, although high, are lower than the protection trigger temperature. This resistance is due to the fact that the fluxes normally used in the majority of prior art thermal fuses are not used.

The system described herein also has the advantage of being dimensionally scalable as required and can therefore be designed to resist currents which are substantially higher than those resisted by prior art thermal fuses.

Lastly, in the electric machine described herein, the elastic element which pushes the conductive element has the twofold purpose of providing the above described protection against high temperature and current and pressing the electronic module against the dissipative wall to facilitate dissipation of heat. Advantageously, this leads to high production efficiency and lower production costs.

The invention claimed is:
1. An electric machine comprising:
an electronic module comprising a printed circuit board, a plurality of electronic power components and a plurality of conductive tracks disposed on the printed circuit board and defining an electric power circuit between respective power pins of the electric machine to provide power supply current for the electronic power components;
an enclosure defining a housing for the electronic module and having a dissipative wall;
a heat-conductive filler interposed between the electronic module and the enclosure to facilitate heat conduction from the electronic module to the dissipative wall;
an elastic device acting on the electronic module to press the electronic module against the dissipative wall of the enclosure so as to compress the heat-conductive filler;
a conductive element disposed in such a way as to connect a first track and a second track of the plurality of conductive tracks so as to close the electric power circuit;
at least one heat-sensitive joint holding the conductive element in position;
the elastic device comprising an elastic element pressed against the conductive element to apply a force on the at least one heat-sensitive joint, and the at least one heat-sensitive joint being configured to be broken by the force when subjected to a temperature higher than a predetermined threshold temperature in order to open the electric power circuit.

2. The electric machine according to claim 1, comprising a stator and a rotor, operatively connected with the stator, disposed inside the enclosure, the stator comprising a stator mount and a plurality of windings wound around the stator mount, the elastic element being disposed in abutment against the stator mount to apply a force between the stator mount and the conductive element.

3. The electric machine according to claim 2, wherein the stator mount comprises a core of ferromagnetic material, one end of the elastic element being disposed in abutment against the core of ferromagnetic material.

4. The electric machine according to claim 3, wherein the elastic element comprises a metal spring and a cover made of electrically insulating material disposed in such a way as to prevent short circuits between the core of ferromagnetic material and the conductive element through the spring.

5. The electric machine according to claim 1, wherein the conductive element is welded or brazed to the first track and/or the second track, the at least one heat-sensitive joint being made of a welding alloy or a brazing alloy.

6. The electric machine according to claim 5, wherein the conductive element is welded to the first and second tracks by two respective heat-sensitive joints and is disposed to overlap the first and second tracks to form a bridge across the first and second tracks.

7. The electric machine according to claim 1, wherein the first and second tracks have a first end portion and a second end portion, respectively, which are spaced apart by a mutual distance of between 5 mm and 10 mm, the mutual distance defining a maximum electric voltage between the first and the second track within which it is possible to guarantee that the electric power circuit will be opened.

8. The electric machine according to claim 1, wherein the printed circuit board includes a recess between the first track and the second track, delimited by an end edge, the first track and the second track having respective first and second end portions protruding from the end edge towards the other of the first track and the second track, the conductive element being fastened to the first and second end portions in a suspended position above the recess.

9. The electric machine according to claim 8, wherein the conductive element and the printed circuit board are mutually positioned and/or configured in such a way that a projection of the conductive element onto a positioning plane of the printed circuit board is at least 1 mm away from the end edge.

10. The electric machine according to claim 1, wherein the conductive element has respective interface surfaces to interface with the first track and/or the second track, configured to allow electric currents greater than 80 amps, to pass through the conductive element without causing the at least one heat-sensitive joint to break.

11. The electric machine according to claim 2, and further comprising a stop element disposed along a direction of thrust of the elastic element, the elastic element being configured, after the at least one heat-sensitive joint has broken, to move the conductive element towards the stop element, the stop element being disposed in such a way as to stop the conductive element at a stop position such that the elastic element maintains a residual pressure against the conductive element sufficient to keep the conductive element in abutment against the stop element.

12. The electric machine according to claim 11, wherein the elastic element is configured to apply the residual pressure in such a way that the conductive element remains at the stop position in the presence of accelerations up to 20g, on the electric machine.

13. The electric machine according to claim 11, wherein the stop element is configured to determine the stop position of the conductive element in such a way as to guarantee a distance of at least 2 mm, between the conductive element and any part of the electric power circuit.

14. The electric machine according to claim 11, wherein the stop element is made of electrically insulating, self-extinguishing material with a melting point which is higher than the threshold temperature.

15. The electric machine according to claim 11, and further comprising a supporting element interposed between the electronic module and the stator to support the electronic module, the supporting element including a through hole for passage of the elastic element between the stator mount and the conductive element, the supporting element being made of electrically insulating, self-extinguishing material with a melting point which is higher than the threshold temperature.

16. The electric machine according to claim 15, wherein the stop element and the supporting element define a protective cage placed around the conductive element and configured to prevent access by particles or extraneous objects large enough to close the electric power circuit when the conductive element is at the stop position.

17. The electric machine according to claim 1, wherein the conductive element is disposed in proximity to a power pin of the electric machine, the first track connecting the power pin to the conductive element and the first track having a heat capacity greater than 2.5 J/K.

18. The electric machine according to claim 1, wherein the plurality of conductive tracks is disposed in relief on the printed circuit board, part of the heat-conductive filler being interposed between the conductive tracks and the enclosure to transmit heat from the conductive tracks to the enclosure.

19. The electric machine according to claim 18, wherein the plurality of conductive tracks are configured and sized in such a way as to define a preferential path for dissipating the heat between the electronic power components and the dissipative wall of the enclosure.

20. The electric machine according to claim 1, wherein the enclosure comprises a casing and a closing cap coupled to each other in such a way as to seal the enclosure, the cap defining a plurality of dissipating fins at the dissipative wall, the elastic device being configured to press the electronic module against the cap, thereby compressing the heat-conductive filler.

21. The electric machine according to claim 1, wherein the threshold temperature is between 180° C. and 250° C.

* * * * *